Sept. 15, 1970 P. HEATON 3,529,093

TELEPHONE EXCHANGE APPARATUS

Filed Nov. 2, 1966 3 Sheets-Sheet 1

PETER HEATON
*Inventor*
By Moore and Hall
Attorney

Sept. 15, 1970 P. HEATON 3,529,093

TELEPHONE EXCHANGE APPARATUS

Filed Nov. 2, 1966 3 Sheets-Sheet 2

PETER HEATON
Inventor
By Moore and Hall
Attorney

PETER HEATON

*Inventor*

By Moore and Hall

*Attorney*

United States Patent Office 3,529,093
Patented Sept. 15, 1970

3,529,093
TELEPHONE EXCHANGE APPARATUS

Peter Heaton, Christchurch, England, assignor to Minister of Aviation in Her Britannic Majesty's Government of the United Kingdom of Great Britain and Northern Ireland, London, England Filed Nov. 2, 1966, Ser. No. 591,528
Claims priority, application Great Britain, Nov. 4, 1965, 46,752/65
Int. Cl. H04q 3/28
U.S. Cl. 179—18 16 Claims

ABSTRACT OF THE DISCLOSURE

Telephone exchange apparatus comprising a shift register for holding a subscriber's number, a trunk channel number and a herald digit, apparatus for inserting a subscriber's number and a herald digit in the shift register and shifting signals along the shift register with the herald digit leading, a local number detector responsive to the arrival of a herald digit in a given stage of the shift register, and a switching crosspoint matrix connected to outputs of the local number detector. Trunk channel supervisory circuits are provided for inserting the number of an available trunk channel into the shift register and causing the contents of the register to be sequentially transmitted to a distant exchange, whenever a distant subscriber's number is applied to the local number detector. Circuits for receiving such signals and completing connections between subscribers are also described. The local number detector is a conventional matrix or tree circuit.

This invention relates to telephone exchange apparatus for the communication of called subscriber's numbers, allocated trunk channel numbers, and other data signals, in binary digital form.

According to the present invention there is provided telephone exchange apparatus comprising a shift register having sufficient stages for holding a subscriber's number, a trunk channel number and a herald digit, insertion means connected to the shift register for inserting a subscriber's number and a herald digit in the shift register and for shifting signals along the shift register with the herald digit leading, local number detection means connected to the shift register, control means connected to the local number detection means and to a predetermined stage of the shift register and responsive to the occurrence of the herald digit therein for rendering effective the local number detection means, and a switching crosspoint matrix connected to receive outputs from the local number detection means.

An embodiment of the invention will now be described, by way of example only, with reference to the accompanying drawings of which:

Figure 1:
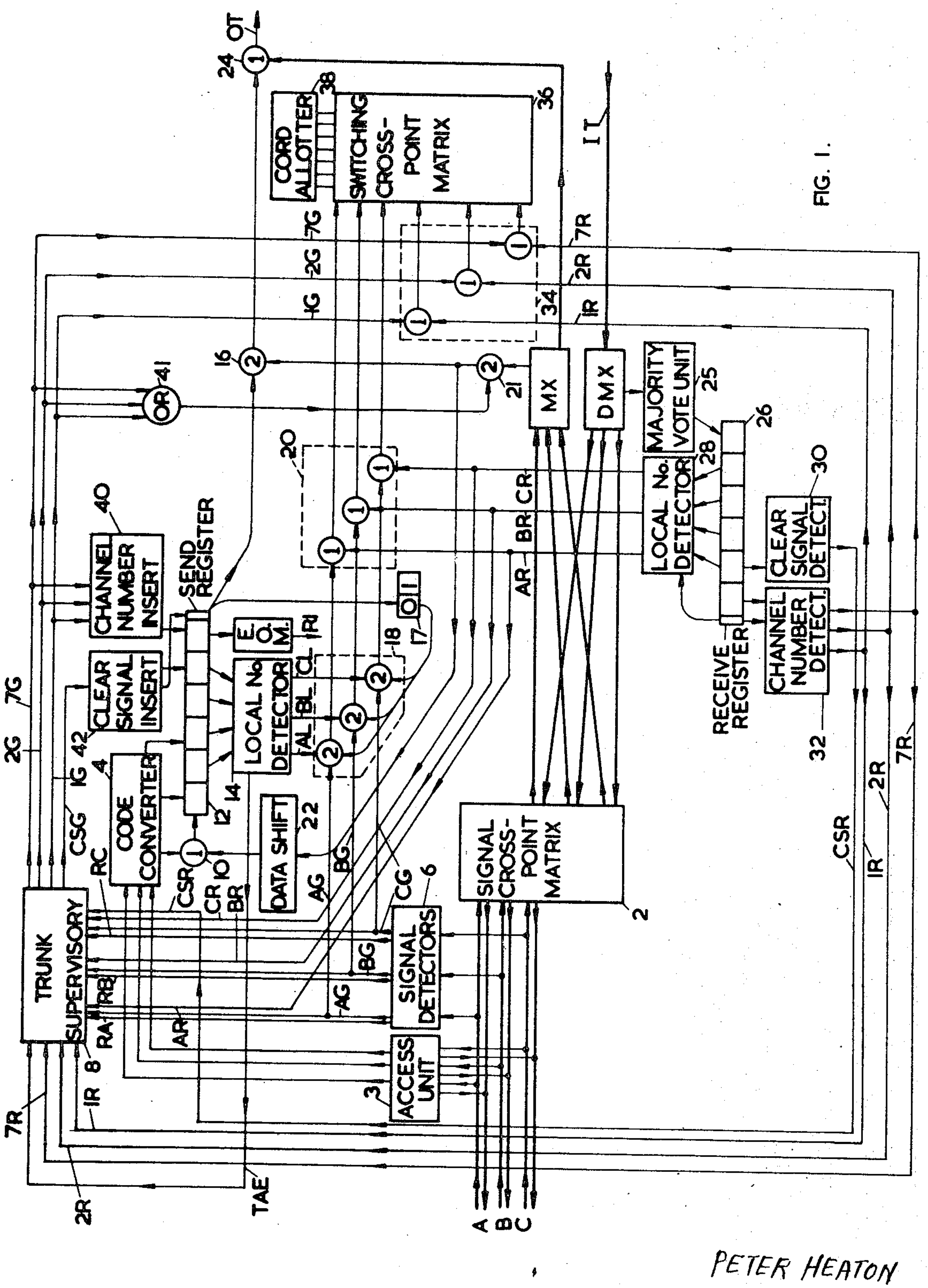
FIG. 1 is a schematic circuit diagram of a local telephone exchange.

FIG. 1 shows schematically the main functional interconnections of parts of a local telephone exchange operating on binary-coded signals. The telephone exchange is arranged to provide and control interconnections between any two of a multitude of local subscribers or between any one of the local subscribers and any one of seven transmission channels which are time-division multiplexed on a trunk connection. To simplify the drawing, the connections to only three typical subscribers A, B and C, and to only three of the seven transmission channels are shown, and some details have been omitted. The symbols used in the drawings are in accordance with Supplement No. 5 to British Standard 530:1948.

An incoming line and a return line from each of the subscribers A, B, C and others not shown, are connected to a signal crosspoint matrix 2. The incoming lines are also connected to separate inputs of an access unit 3 and of a set 6 of signal detectors. The signal detectors 6 provide outputs on lines AG, BG, CG and others not shown whenever messages are being received on the incoming lines from the corresponding subscribers A, B, C, etc., and provide outputs on lines RA, RB, RC and others not shown whenever the corresponding subscribers A, B, C, etc. replace their handsets. The lines AG, BG, CG, RA, RB, RC and others not shown are connected to inputs of a trunk supervisory circuit 8. Signal outputs from the access unit 3 are connected to inputs of a code converter unit 4. Outputs from the code converter 4 are connected to an OR-gate 10 and to inputs of a send register 12, which is a shift register having forty-three single bit locations. The first forty-two locations (not individually shown or numbered in FIG. 1) of this register 12 are used in groups of seven to store binary-coded decimal digits. The aforementioned outputs of the code converter 4 are connected to the first group, comprising the first seven locations, and to the fifteenth location respectively of the send register 12. The output of the OR-gate 10 is connected to a shift control input of the send register 12. The second, third, fourth and fifth groups comprising locations 8 to 35 inclusive of the send register 12 will in the operation of the exchange as hereinafter described become filled with the number of a wanted subscriber, and have output connections to a local number detector 14. The local number detector 14 comprises a matrix or tree circuit having outputs AL, BL, CL and others not shown, each of these outputs being associated with a separate local subscriber and being energised when signals representing the associated subscriber's number appear in the locations eight to thirty-five inclusive of the send register 12. Locations thirty-five to forty-three inclusive of the send register 12, comprising the sixth group plus locations thirty-five and forty-three, are connected to an end-of-message detector EOM which provides an output R1 used for resetting various parts of the exchange. Connections from the output R1 are not shown in FIG. 1. An output from the forty-third and final location of the shift register 12 is connected to an input of a gate 16 and to a setting input for the 0-state of a monostable trigger circuit 17.

An output from the 0-state of the trigger circuit 17 controls a set 18 of gates. Each of the gates 18 is associated with a separate local subscriber, has a first input connected to one of the output lines AG, BG, CG, etc. from the signal detectors 6 and has a second input connected to the corresponding one of the output lines AL, BL, CL, etc. from the local number detector 14. Outputs from the gates of the set 18 are connected to inputs of corresponding separate OR-gates of a set 20.

Output lines from the signal crosspoint matrix 2, which in operation will carry outgoing trunk call signals for transmission in seven time-division multiplex channels, are connected to inputs of a multiplexer MX. An output from the multiplexer MX is connected to an AND-gate 21, whose output controls the gate 16 and is also applied to a data shift circuit 22. An output from the circuit 22 is connected to a second input of the OR-gate 10. Outputs from the gate 16 and from the multiplexer MX are applied through an OR-gate 24 to an outgoing trunk line OT.

An incoming trunk line IT is connected to a demultiplexer DMX. Outputs from the demultiplexer DMX are connected to the signal crosspoint matrix 2 and to a majority vote unit 25. The output of the majority vote unit 25 is connected to the input of a receive register 26, which is a shift register similar to the send register 12. Outputs from the receive register 26 are connected to a local number detector 28, a clearance signal detector 30, and a channel number detector 32. The local number detector 28 includes a matrix or tree circuit having outputs AR, BR, CR and others not shown, each associated with a separate local subscriber and being energised when the associated subscriber's number appears in the receive register 26. The outputs AR, BR, CR etc. are connected to separate inputs of the trunk supervisory circuit 8 and to inputs of corresponding separate OR-gates of the set 20. An output TAE from the local number detector 14 and an output CSR from the clearance signal detector 30 are also connected to separate inputs of the trunk supervisory circuit 8. The channel number detector 32 is a simple matrix or tree circuit having seven outputs of which only three, namely 1R, 2R and 7R, are shown in FIG. 1. The outputs of the channel number detector 32 are connected to separate inputs of the trunk supervisory circuit 8 and to inputs of corresponding separate OR-gates 34 the outputs of which are connected to separate inputs of a switching crosspoint matrix 36. The matrix 36 is connected to a cord allotter 38. Seven outputs from the trunk supervisory circuit 8 of which three, namely 1G, 2G and 7G, are shown in FIG. 1, are connected to separate inputs of a channel number inserter 40, to the inputs of an OR-gate 41, and to inputs of corresponding separate gates of the set 34. An output CSG from the trunk supervisory circuit 8 controls a clearance signal inserter 42. The clearance signal inserter 42 and the channel number inserter 40, which may comprise sets of gates appropriately connected to "one" and "zero" reference voltages, have outputs respectively connected to the fifth and to the sixth group of locations in the send register 12. The output of the OR-gate 14 controls the AND-gate 21.

The operation of the telephone exchange of FIG. 1 will now be described. When a local subscriber, for instance A, wishes to make a call, he lifts his handset (not shown) and listens for the dialling tone. If the code converter 4 is not engaged in the process of establishing another call, the access unit 3 will supply dialling tone to any handset which is lifted. Subscriber A then dials the wanted number, sending dialling signals which represent the wanted number in a digital form to one of the signal detectors 6 and also through the access unit 3 to the code converter 4. The dialling signals are distinguishable from speech signals by their carrier frequencies or amplitudes. The first of the dialling signals received from A closes gates (not shown) in the access unit 3 so that dialling tone is not supplied to any other local subscriber, and the connections from other local subscribers to the code converter 4 are broken, until A's connection is established. Thus the access unit 3 makes the superimposition in the code converter 4 of dialling signals from different local subscribers a very unlikely occurrence. The code converter 4 translates the wanted number signals into a code known as "920 telecode" in which each decimal digit is represented by a code of seven binary digits. The code converter 4 operates on one decimal digit at a time. There are four decimal digits in each subscriber's number, so the code converter operates in four stages. Firstly it transfers a translated version of the first digit of the wanted number into the first seven locations of the send register 12, and at the same time puts a "one" signal (hereinafter called the herald digit) into the fifteenth location. Then by a signal sent through the OR-gate 10 it causes the contents of the send register 12 to be moved seven locations to the right. Secondly, it transfers a translated version of the second digit of the wanted number into the first seven locations of the send register 12 and again causes the contents of the send register to be moved seven locations to the right. The third and fourth digits are entered into the send register 12 by similar transferring and shifting actions, so that the wanted number eventually occupies locations 8 to 35 inclusive and the herald digit signal originally put into the fifteenth location arrives in the forty-third location of the send register 12. The arrival of this herald digit in the forty-third location indicates the completion of the dialling operation and shows that the wanted number is now in position in the send register 12; it puts the trigger circuit 17 into the 0-state and thereby opens the gates 18.

If the wanted number is that of another local subscriber, for instance C, the local number detector 14 will now produce an output on a corresponding one of its output lines—in this case the line CL. The corresponding gate of the set 18 will then apply the signal to a row of the switching crosspoint matrix 36.

The switching crosspoint matrix 36 is a single stage rectangular matrix having a plurality of vertical cords, a row for each local subscriber and a row for each multiplex channel on the trunk lines OT and IT. Now, one row of the matrix 36 is already energised, because the signals from the subscribed A have also been applied to a corresponding one of the signal detectors 6 which in response thereto has energized the corresponding line AG. Thus while the trigger circuit 17 remains in the 0-state the row A (not show) of the matrix 36 is energised by a signal from the line AG and the row C is energised by a signal from the line CL. The occurrence of the second of these signals operates equipment (not shown) in the matrix 36 and in the cord allotter 38 to select an unused cord and operate crosspoints at which the selected cord intersects the rows A and C. Each crosspoint of the matrix 36 controls a corresponding crosspoint of the signal crosspoint matrix 2. Thus two crosspoints of the matrix 2 are operated. These crosspoints (not shown) comprise relays which interconnect the subscribers A and C for two-way communication through a cord of the matrix 2. The send register 12 is then cleared by an output (not shown in FIGS. 1) from the local number detector 14, and the trigger circuit 17 returns to its stable 1 state.

If, however, the wanted number placed in the send register 12 is not a local number, then the local number detector 14 energises its output TAE (trunk access enable) instead of a line such as the line CL. The line AG is energised as before, by the action of the corresponding one of the signal detectors 6. Thus the trunk supervisory circuit 8 receives inputs on the lnies AG and TAE and in response thereto it allocates, if possible, an available multiplex channel to the call and energises the corresponding one of its output lines. For instance, it may allocate channel two of the multiplex to the call and energise its output line 2G to give effect to this allocation. Thus two rows of the switching crosspoint matrix 36 are energised by the signals from the lines AG and 2G respectively. An unused cord of the matrix 36 is therefore selected, and corresponding crosspoints of the signal crosspoint matrix 2 are operated to connect the calling subscriber A via the multiplexer MX to channel two of the multiplex on the outgoing trunk line OT and via the demultiplexer DMX to channel two of the multiplex on the incoming trunk line IT.

To complete the setting-up of the desired connection it is necessary to convey the wanted number and the number of the multiplex channel allocated to the call to a distant exchange (not shown,, but similar to FIG. 1). For this purpose, the channel output (2G in the present example) of the trunk supervisory circuit 8 is also applied to the channel number inserter 40. This inserts the number of the allocated channel in a binary-coded form into locations thirty six to forty two inclusive of the send register 12. The contents of the send register 12 are now transmitted to the distant exchange. Such signals are, in the telephone system of which the exchange of FIG. 1 forms a part, always sent in a time-slot of the multiplex cycle which is reserved for data signals. The channel output (2G) of the trunk supervisory circuit 8 passes through the OR-gate 41 and prepares the gate 21. Hence, detectors 30 and 32 respectively, are connected to inputs of an AND-gate 72. The line CM1A and corresponding lines from each of the other crosspoints in column one are connected through an OR-gate 74 and a line CM1 to a 0-state setting input of a bistable trigger circuit 76. A 0-state output from the trigger circuit 76 is connected to a gate 78. The output of the gate 78 is connected to another AND-gate 79 whose output is connected by a line P1 to a 1-state setting input of the bistable trigger circuit 76. The line P1 and the output of the AND-gate 72 are connected through an OR-gate 80 to the line RS1.

Figure 2:
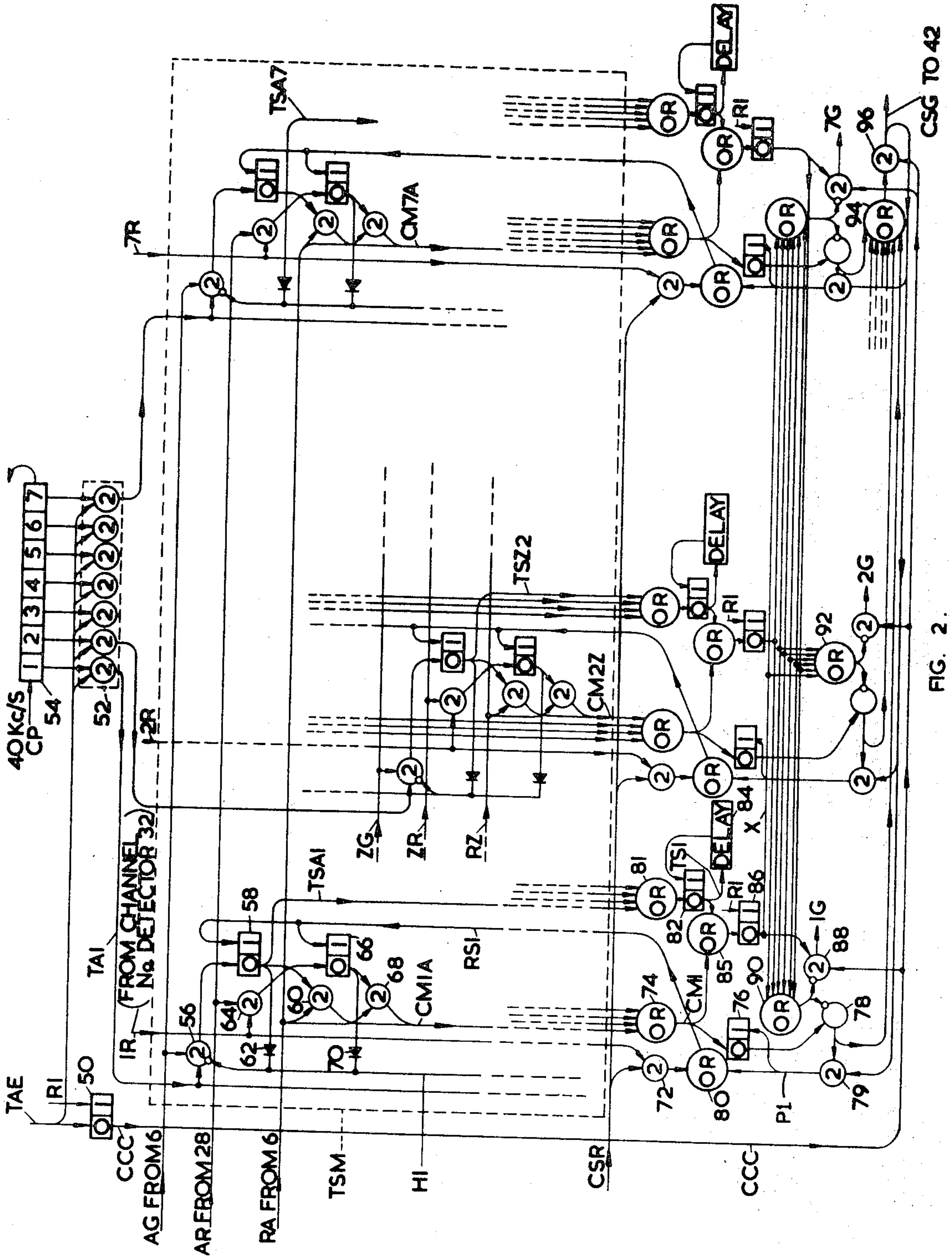
FIG. 2 is a schematic circuit diagram of part of the telephone exchange of FIG. 1.

The line TSA1 and corresponding lines from each of the other crosspoints in column one are connected through an OR-gate 81 to a 0-state setting input of a monostable circuit, which is represented on FIG. 2 as a trigger 82 associated with a delay unit 84. A 0-state output from the trigger circuit 82 is connected to a line TS1. The lines CM1 and TS1 are connected through an OR-gate 85 to a 0-state setting input of a bistable trigger circuit 86. A 0-state output from the trigger circuit 86 is connected to an input of an AND-gate 88. OR-gate 90 has an output connected to inhibiting inputs of the gates 78 and 88. Similar components (not all shown) to those listed in this paragraph and the preceding paragraph, are provided for each column of the matrix. The 0-state outputs of the bistable trigger circuits which correspond to the circuit 86 and are associated with columns other than column one are connected to the inputs of the OR-gate 90. The 0-state output of the circuit 86 is connected to an input of each of the OR-gates which correspond to the OR-gate 90 and are associated with columns other than column one. Each of these OR-gates receives inputs from all those trigger circuits which are associated with other columns and correspond to the trigger circuit 86. For instance, the corresponding OR-gate associated with column two, which is marked 92 in FIG. 2, receives inputs from the trigger circuits associated with columns other than column two, comprising the trigger circuit 86 and others corresponding to it.

An output from the 0-state of the bistable trigger circuit 50 is connected by a line CCC to control inputs of the gate 88 and of the corresponding gates associated with other columns of the matrix TSM. The output of the gate 88 is connected to the output line 1G, and the corresponding gates associated with other columns are respectively connected to the output lines 2G to 7G inclusive (not all shown on the drawings). The output of the gate 78, and the outputs of other corresponding gates associated with the other columns, are connected to inputs of an OR-gate 94. The output R1 from the end-of-message detector EOM (FIG. 1) is connected to 1-state setting inputs of the trigger circuit 86 and the corresponding trigger circuits associated with other columns.

The line CCC and the output of the OR-gate 94 are connected to separate inputs of an AND-gate 96. The output of the gate 96 is connected to an input of the gate 79 and to an input of each of the corresponding gates associated with other columns of the matrix TSM, and is also connected to the output line CSG, which goes to the clearance signal inserter 42 (on FIG. 1).

The operation of the trunk supervisory circuit of FIG. 2 will now be more fully described. When a local subscriber, for instance A, wishes to make a trunk call he dials the wanted number and as a result the line AG is energised by one of the signal detectors 6. The line TAE is also energised, by the local number detector 14. Because the line TAE is energised, the gates 52 are opened and the lines such as TA1 from their outputs are consecutively energised by the outputs from the stepping switch 54. Now, each column of the matrix controls, or supervises, one channel in the time-division multiplex on the trunk line OT to which the telephone exchange (FIG. 1) is connected. Some of these channels will usually be already in use, or "busy." On the columns supervising busy channels, all the gates corresponding to the gate 56 (FIG. 2) will be inhibited by signals on their inhibiting lines (such as the line HL). If, however, the channel one is not in use, the gate 56 will not be inhibited and will be operated by the concurrence of signals on the lines TA1 and AG. The trigger circuit 58 will therefore be put into the 0-state, thereby energising the lines TSA1 and H1, and preparing the gate 60 for subsequent operation. The energisation of the line H1 indicates that channel one has now been allocated for subscriber A's trunk call, and prevents any other allocation of channel one by inhibiting the gate 56 and corresponding gates in column one. The energisation of the line TSA1 puts the monostable trigger circuit 82 and the bistable trigger circuit 86 into their 0-states. Since the energisation of the line TAE has put the trigger circuit 50 into its 0-state, there is a resulting output on the line CCC which has prepared the gate 88 for operation. The OR-gate 90 and corresponding OR-gates associated with other columns are provided to prevent any attempt to energise more than one at a time of the lines 1G to 7G inclusive. If any one of the trigger circuits corresponding to the circuit 86 but associated with outer columns of the matrix TSM is in the 0-state, then its output will pass through the OR-gate 90 and inhibit the operation of the gate 88 until the trigger circuit concerned has been reset. When the OR-gate 90 does not inhibit the gate 88, the output from the circuit 86 passes through the gate 88 to the line 1G. This operates other apparatus of the system to establish the desired connection as hereinbefore described with reference to FIG. 1.

When a subscriber connected to a distant exchange wishes to call a local subscriber, for instance A, signals are received on the line AR from the local number detector 28 (FIG. 1) and on a line such as 1R, for instance, from the channel number detector 32 (FIG. 1). These signals operate the gate 64 and put the bistable trigger circuit 66 into the 0-state. The resulting output from the circuit 66 energises the inhibiting line H1 and prepares the gate 68 for operation. Thus the use of the channel one for this call is indicated by the energisation of the line H1, and this prevents any attempt to re-allocate channel one for any other simultaneous call.

When a local subscriber, for instance A, terminates a call by replacing his handset, a signal from one of the detectors 6 (FIG. 1) is applied to the line RA. This will operate one of the gates 60 or 68 (one or the other of these gates will have been prepared for operation as described hereinabove, when the connection was set up). Thus an output is produced on the line CM1A which puts the bistable trigger circuits 76 and 86 into the 0-state. This normally operates the gates 78, 88, 96 and 79 to produce signals on the lines CSG and 1G. The OR-gate 90 prevents any attempt to send clearance signals for channel one and any other channel simultaneously. It ensures that such signals are sent consecutively and not superimposed, by inhibiting the gates 78 and 88 if necessary. The output of the gate 79 energises the line RS1 thereby resetting the bistable trigger circuits 58 and 66 to the 1-state, and also resets the bistable trigger circuit 76 to the 1-state. The former action also removes the inhibiting signal from the line H1.

When a distant subscriber terminates a call by replacing his handset, signals are received on the line CSR from the clearance signal detector 30 (FIG. 1) and on a line, such as 1R for instance, corresponding to the channel used for the call. This operates the gate 72 to energise the line RS1 and thereby resets the bistable trigger circuits 58, 66, etc. associated with the column for the channel concerned.

Figure 3:
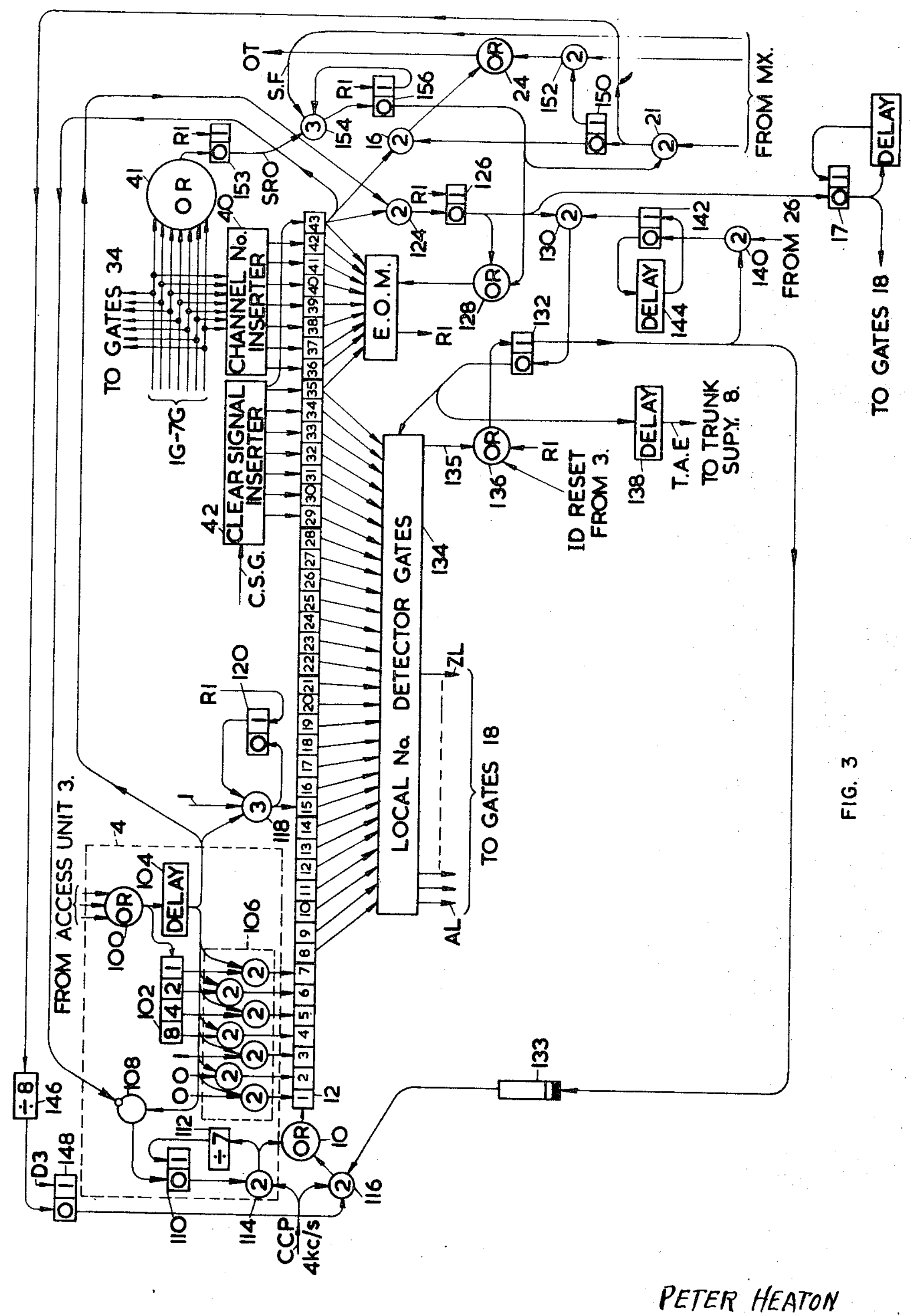
FIG. 3 is a schematic circuit diagram of another part of the telephone exchange of FIG. 1.

FIG. 3 shows further details of the code converter 4, the send register 12, the local number detector 14 and various other parts of the system associated therewith. Parts which are shown in FIG. 1 and in FIG. 3 bear the same reference numbers in both figures. Some of the details which were omitted from FIG. 1 are shown in FIG. 3.

whenever the data signal time-slot of the time-division multiplex occurs, an output from the multiplexer MX passes through the gate 21, opens the gate 16 and operates the data shift circuit 22. The signal in the forty-third location of the send register 12 is transmitted eight times and then a signal from the data shift circuit 22 moves the contents of the send register 12 one location to the right. This process is repeated so that each digit-signal in the send register 12 is brought into the forty-third location, transmitted eight times, and then discarded. When the last digit-signal has been transmitted, the end-of-message detector EOM detects the absence of signals in locations thirty-five to forty-three inclusive and provides an output R1 which resets various circuits. This terminates the channel output (2G) but leaves the trunk supervisory circuit in a condition indicating that channel two is in use by subscriber A.

When a subscriber at a distant exchange wants to make a call to a local subscriber, for instance C, signals representing the number of the channel allocated to the call and the wanted subscriber's number are transmitted from the send register of the distant exchange (not shown) and are received on the incoming trunk IT. These signals are separated out by the demultiplexer DMX and applied to the majority vote unit 25. The unit 25 in effect removes the eight-fold repetition in the received data signals. When a set of eight data signals as received appears to contain five or more "one" signals, it produces a "one" output. When a set of received data signals appears to contain five or more "zero" signals, it produces a "zero" output. These output signals from the unit 25 are placed in the receive register 26. When the first of these signals reaches the last location of the receive register it prepares the channel number detector 32 and the local number detector 28. The channel number detector 32 then produces an output on a line corresponding to the allocated channel, for instance on the line 7R if channel seven has been allocated to the call. The output on the line 7R is applied to the trunk supervisory circuit 8 so that the trunk supervisory circuit 8 will not attempt to allocate channel seven to any other call, and is also applied through one of the OR-gates 34 to a row of the switching crosspoint matrix 36. The wanted number (denoting subscriber C) is applied to the local number detector 28 which produces an output on a line associated with the wanted subscriber (in this case the line CR). The output on the line CR passes through one of the gates 20 to a row of the matrix 36 associated with subscriber C. The outputs on the lines 7R and CR cause the cord allotter 38 to select an unused cord of the matrix 36 and to operate the crosspoints at which the cord intersects the rows associated with subscriber C and channel seven. This actuates corresponding crosspoints of the signal crosspoint matrix 2 to connect the called subscriber C via the multiplexer DMX to channel seven on the incoming trunk line IT and via the demultiplexer MX to channel seven on the outgoing trunk line OT.

When a local subscriber (for instance A) terminates a call by replacing his handset (not shown), this causes a signal to be provided on a corresponding one of the output lines (in this case the output line RA) of the signal detectors 6. This causes the trunk supervisory circuit 8 to emit signals on the line CSG and on one of the lines 1G to 7G indicating the channel used for the call which should now be disengaged. For instance, if the terminated call has been using channel two, signals are emitted on the lines CSG and 2G. The signal on the line CSG causes the clear signal inserter 42 to insert a clearance code signal into locations twenty-nine to thirty-five, and a "one" signal into location forty-three of the send register 12. The signal on the line 2G simultaneously causes the channel number inserter 40 to insert the channel number (0010010=two in 920 telecode) into locations thirty-six to forty-two of the send register 12. The signals in the send register 12 are then treated as a data signal and transmitted bit by bit through the gates 16 and 24 during data signal time-slots of the time-division multiplex cycle. The clearance signal is distinguishable from any subscriber's number. At the distant exchange they cause a clearing action as will be described in the next paragraph. The signal on the line CSG also resets the trunk supervisory circuits from which it came, so that the signal on the line 2G ceases after a short delay.

When a clearance signal arrives from another exchange, it arrives during data signal time-slots of the time-division multiplex and is therefore directed by the demultiplexer DMX through the majority vote unit 25 and thence into the receive register 26. Its presence in the receive register 26 operates the clear signal detector 30 and the channel number detector 32 to produce signals on the line CSR and on one of the lines 1R to 7R, indicating the channel used for the call which should now be disengaged. For instance, if the terminated call has been on channel two, signals are produced on the lines CSR and 2R. These signals reset the trunk supervisory circuit 8 so that the signal on its output 2G ceases.

FIG. 2 shows the trunk supervisory circuit 8 in more detail. The TAE line, which comes from the local number detector 14 of FIG. 1, is connected to a 0-state setting input of a bistable trigger circuit 50 and to controlling inputs of a set of trunk access control gates 52. The gates 52 are respectively connected to separate outputs of a stepping counter 54 which is driven by clock pulses on a line CP. The stepping counter 54 actually forms a part of the multiplexer MX of FIG. 1. The resetting output R1, from the end-of-message detector EOM of FIG. 1, is connected to the 1-state setting input of the trigger circuit 50.

The heart of the trunk supervisory circuit 8 is a matrix TSM which has one row for each local subscriber and one column for each multiplex channel. Each row includes three conductor lines of which two are connected to outputs from the signal detectors 6 (of FIG. 1) and one is connected to a corresponding output from the local number detector 28 (of FIG. 1). For instance the row associated with the subscriber A includes lines RA and AG from one of the signal detectors 6 and a line AR from the local number detector 28. Each column includes four conductor lines. For instance the column associated with the multiplex channel one includes a trunk access control line TA1 (connected to the output of one of the gates 52) a channel required line 1R (connected to an output of the channel number detector 32 of FIG. 1), an inhibiting line H1 and a resetting line RS1. At each intersection of a row and a column, the various lines are interconnected by a group of components forming a crosspoint assembly. To simplify the drawing, only three of the crosspoint assemblies are shown in FIG. 2; these are at the intersections for row A and column one, row A and column seven, and row Z and column two respectively.

The crosspoint assembly at the intersection of row A and column one includes an AND-gate 56 which has normal inputs connected to the lines AG and TA1 and an inhibiting input connected to the inhibiting line H1. The output of the AND-gate 56 is connected to a 0-state setting input of a bistable trigger circuit 58. A 0-state output from the trigger circuit 58 is connected to a line TSA1 and to an input of an AND-gate 60, and through an OR-gate in the form of a diode 62 to the inhibiting line H1. An AND-gate 64 has two inputs connected to the lines 1R and AR respectively and an output connected to a 0-state setting input of a bistable trigger circuit 66. A 0-state output from the circuit 66 is connected to an input of an AND-gate 68 and through an OR-gate in the form of a diode 70 to the inhibiting line H1. The AND-gates 60 and 68 also have inputs connected to the line RA and outputs connected to a line CM1A. The resetting line RS1 is connected to 1-state setting inputs of the trigger circuits 58 and 66. The other crosspoint assemblies of the matrix TSM are similar.

The line CSR and the line 1R, which come from the

The code converter 4, as shown in FIG. 3, includes an OR-gate 100 which has separate inputs connected (via the access unit 3) to the incoming lines from all local subscribers connected to the exchange. The output of this OR-gate 100 is connected to a four-stage binary counter 102 and to a delay unit 104. The output of the delay unit 104 controls a set 106 of seven AND-gates and is also connected to an input of a gate 108. The seven AND-gates of the set 106 have separate outputs respectively connected to the first seven locations in the send register 12. The first three of the AND-gates 106 have inputs connected to voltage supplies representing binary digits zero, zero and one respectively. The last four of the gates 106 have inputs respectively connected to the four stages of the binary counter 102. The output of the gate 108 is connected to a 0-state setting input of a bistable trigger circuit 110. A pulse counter 112 used as a divide-by-seven unit has an output connected to a 1-state setting input of the trigger circuit 110. A 0-state output from the circuit 110 is connected to an input of an AND-gate 114.

A clock pulse reference input on a line CCP is connected to another input of the AND-gate 114 and to an input of an AND-gate 116. Outputs from the gates 114 and 116 are connected to inputs of the OR-gate 10, whose output controls the shifting action of the send register 12. The output of the gate 114 is also connected to the input of the pulse counter 112.

An output from an AND-gate 118 of threshold three is connected to the fifteenth location of the send register 12 and to a 0-state setting input of a bistable trigger circuit 120. The AND-gate 118 has a first input connected to the output of the delay unit 104, a second input connected to a voltage representing a "one" digit, and a third input connected to a 1-state output from the trigger circuit 120.

The clearance signal inserter 42, which has an input connected to the line CSG from the trunk supervisory circuit 8 (FIGS. 1 and 2) has seven outputs respectively connected to the locations twenty-nine to thirty-five inclusive of the send register 12. The lines 1G to 7G inclusive from the trunk supervisory circuit 8 (not shown in FIG. 3) are connected to inputs of the channel number inserter 40, to inputs of an OR-gate 41, and to inputs of the gates 34 (not shown on FIG. 3). The channel number inserter 40 has seven outputs respectively connected to the thirty-sixth to forty-second locations of the send register 12.

Outputs from the thirty-fifth to the forty-third locations of the send register 12 are connected to the end-of-message detector EOM. Outputs from the forty-third location of the send register 12 are also connected to inputs of AND-gates 124 and 16 and to an inhibiting input of the gate 108, which latter gate is a part of the code converter 4.

The output of the gate 124 is connected to a 0-state setting input of a bistable trigger circuit 126. A 0-state output from this trigger circuit 126 is connected to inputs of an OR-gate 128 and an AND-gate 130, and to the 0-state setting input of the monostable trigger circuit 17. The output of the AND-gate 130 is connected to a 0-state setting input of a bistable trigger circuit 132. A 0-state output from the trigger circuit 132 is connected to control the local number detector gates 134. These gates 134 (not shown in detail) have inputs respectively connected to the locations from eight to thirty-five inclusive of the send register 12, and have outputs connected by lines AL, BL, CL and others not shown to gates of the set 18 (on FIG. 1). The gates 134 form the major part of the local number detector 14 of FIG. 1. As hereinbefore stated, they are arranged in a matrix or tree circuit so that the appropriate one of the lines AL, BL, CL, etc. is energised when the number of the associated subscriber (A, B, C . . . etc.) appears in locations eight to thirty-five inclusive of the send register 12, provided that the trigger circuit 132 is in the 0-state. (The latter limitation is one of the details omitted to simplify the description of FIG. 1.) The gates 134 are also arranged to provide another output on a line 135 whenever locations eight to thirty-five inclusive of the send register 12 contain the number of a subscriber connected to a distant exchange and the trigger circuit 132 is in the 0-state. The line 135 is connected through an OR-gate 136 to a 1-state setting input of the bistable trigger circuit 132. The 0-state output of the trigger circuit 132 is also connected via a delay unit 138 and the line TAE to the trunk supervisory circuit 8 (not shown on FIG. 3). A 1-state output from the trigger circuit 132 is connected to an input of an AND-gate 140 and through a beginning element 133 to an input of the gate 116. The output of this AND-gate 140 is connected to a 0-state setting input for a monostable circuit which is represented on FIG. 3 as a trigger circuit 142 associated with a delay unit 144. A 1-state output from this trigger circuit 142 is connected to an input of the AND-gate 130.

An output from the multiplexer MX (FIG. 1) carrying data channel timing signals is connected to an input of an AND-gate 21. The output of this AND-gate 21 is connected to a pulse counter 146 which is used as a divide-by-eight unit. The output of the pulse counter 146 is connected to a 0-state setting input of a bistable trigger circuit 148. A 0-state output from this trigger circuit 148 is connected to an input of the AND-gate 116. The counter 146, the trigger circuit 148 and the gate 116 constitute the major part of the data shift unit 22 of FIG. 1. A further timing signal output from the multiplexer MX (not shown on FIG. 1) is connected by a line D3 to a 1-state setting input of the trigger circuit 148.

The output of the gate 21 is also connected to a 0-state setting input of a bistable trigger circuit 150. This trigger circuit 150 has a 0-state output connected to an input of the gate 16 and a 1-state output connected to an input of an AND-gate 152. Output from the gates 16 and 152 are connected through the OR-gate 24 to the outgoing trunk line OT. A line from the multiplexer MX (FIG. 1) carrying all the speech signals multiplexed in seven channels is connected to an input of the gate 152.

The output of the OR-gate 41 is connected to a O-state setting input of a bistable trigger circuit 153. A O-state output from this trigger circuit 153 is connected to a first input of an AND-gate 154. The output of this AND-gate 154 is connected to a 0-state setting input of a bistable trigger circuit 156. This trigger circuit 156 has a 1-state output connected to a second input of the AND-gate 154 and a 0-state output connected to inputs of the OR-gate 128 and the AND-gate 21. A further signal from the multiplexer MX (FIG. 1) is connected by a line S.F to a third input of the AND-gate 154. An output R1 from the end-of-message detector EOM is connected by means not fully shown to the OR gate 136 and to 1-state setting inputs of the bistable trigger circuits 120, 126, 153 and 156. The end-of-message detector EOM may comprise a nine-input NOR-gate with an AND-gate in series with its output. A resetting line from the access unit 3 (FIG. 1) which is energised when a local subscriber has dialed an incomplete number is connected to the OR-gate 136.

The parts of the telephone exchange shown in FIG. 3 operate as follows. When a local subscriber dials the first decimal digit of a wanted number, a corresponding number of pulses are sent through the OR-gate 100 and counted by the binary counter 102. The subsequent output from the delay unit 104 opens the gates 106, thereby transferring the prefix 001 and the binary readings of the counter 102 into the first seven locations of the send register 12. The output of the delay unit 104 also puts the trigger circuit 110 into the 0-state and opens the gate 118. The latter action inserts a "one" signal into the fifteenth location of the send register 12. The signal from the gate 118 also puts the trigger circuit 120 into its 0-state thereby removing one of the inputs to the gate 118 and preventing any further similar insertions until the circuit 120 is reset by a signal from the end-of-message detector EOM on the line R1. When the trigger circuit 110 goes into the 0-state, its output opens the gate 114 to allow pulses from the line CCP to operate the shifting action of the send register 12. The pulses passing from the line CCP through the gate 114 are counted by the counter 112, and the seventh pulse is applied to the trigger circuit 110 to put it back into the 1-state. Thus the signals now in the send register 12 are shifted seven locations to the right in FIG. 3.

When the local subscriber dials the second decimal digit of the wanted number, a corresponding number of pulses are sent through the OR-gate 100 and counted by the binary counter 102. The delay unit 104 and the gates 106 function as before to enter the prefix 001, which indicates a number (as distinct from other characters or symbols) in the 920 telecode, and a binary-coded version of the second digit, into the first seven locations of the send register 12. No entry is made in the fifteenth location as the gate 118 is inhibited by the state of the circuit 120. The trigger circuit 110, the gate 114 and the counter 112 then operate as before to shift the signals seven locations to the right in the send register 12. When the third and fourth digits are dialled, these processes are repeated, so that on the completion of dialling the wanted number is represented by signals in locations eight to thirty-five inclusive of the send register 12 and the "one" signal originally inserted in the fifteenth location has been shifted to the forty-third location of the register 12. The arrival of this "one" signal in the forty-third location inhibits the gate 108, thereby preventing further shifting of the information in the send register 12 by subsequent dialling signals. In conjunction with the output from the delays unit 104 the "one" in the forty-third location opens the gate 124 to put the bistable trigger circuit 126 into the 0-state. The resulting 0-state output from the circuit 126 renders the end-of-message detector EOM operative, opens the gate 130 and puts the trigger circuits 17 and 132 into the 0-state. This prepares the gates 18 (FIG. 1) and sends an interrogating signal to the local number detector gates 134.

If the wanted number is that of a local subscriber, the gates 134 will then produce an output on a corresponding one of the lines AL, BL, CL . . . and an output on the line 135 which puts the trigger circuit 132 back into the 1-state. In this case, the period during which the trigger circuit 132 is in the 0-state is short, and insufficient to actuate the delay unit 138 which is slow to operate. When the trigger circuit 132 returns to the 1-state, it operates the beginning element 133. The output of the beginning element 133 opens the gate 116 for a period in which forty-three pulses from the input CCP are passed to the shift input of the send register 12. This clears the send register 12. The connection is completed by other parts of the system as hereinbefore described with reference to FIG. 1.

If the wanted number is not that of a local subscriber, no outputs are produced from the gates 134 and the trigger circuit 132 remains in the 0-state. The 0-state output from the circuit 132 then energises the line TAE. This operates the trunk supervisory circuit (FIG. 2), which allocates a channel to the call as hereinbefore described and produces a signal on a corresponding one of the lines 1G to 7G.

This signal operates the channel number inserter 40 to insert the number of the allocated channel into locations thirty-six to forty-two inclusive of the send register 12, the number being expressed in "920 telecode" as 001 followed by a binary-coded decimal digit. It also puts the bistable trigger circuit 153 into the 0-state. The resulting 0-state output from the circuit 153 prepares the gate 154 for operation. At the start of the next multiplex frame, an output on the line S.F from the multiplexer MX (FIG. 1) passes through the gate 154 and puts the bistable trigger circuit 156 into the 0-state. The 0-state output from the circuit 156 opens the gate 21, allowing data channel timing signals from the multiplexer MX (FIG. 1) to pass to the bistable trigger circuit 150 and to the pulse counter 146. Thus the circuit 150 is put into the 0-state during data signal transmission periods, opening the gate 16 so that the signal in the forty-third location of the send register 12 is transmitted onto the outgoing trunk line OT. The data signal timing pulses from the gate 21 are counted by the counter 146. Every eighth pulse puts the bistable trigger circuit 148 into its 0-state and thereby causes all signals in the send register 12 to be shifted one location to the right. The signal D3 from the multiplexer MX occurs soon after each data transmission period, resetting the circuit 148 after every shift. Thus each signal in the send register 12 is transmitted eight times during data signal transmission periods. Meanwhile, during the other channel transmission periods the trigger circuit 150 is returned to its 1-state, opening the gate 152 and closing the gate 16 so that the multiplexed speech signals from the multiplexer MX (FIG. 1) are fed to the outgoing trunk OT. When the last signal in the send register 12 has been transmitted for the eighth time and then shifted out to the right, the locations thirty-five to forty-three inclusive will be empty and this will cause the end-of-message detector EOM to produce an output R1. This output R1 then causes the bistable trigger circuits 50 (on FIG. 2), 120, 126, 132, 153 and 156 to be reset. The resetting of the circuit 50 (FIG. 2) terminates the signal on the allocated channel line (one of the lines 1G to 7G) by closing the gate 88 and other corresponding gates. By this time the switching crosspoint matrix 36 will have operated, as hereinbefore described with reference to FIG. 1, to connect the local subscriber to the allocated channel on the trunk lines IT and OT.

When a local subscriber terminates a call by replacing his handset, a sequence of actions as hereinbefore described produces a clearance signal and a signal on one of the lines 1G to 7G. The latter signal passes through the OR-gate 41 and initiates a sequence of operations as described in the preceding paragraph. The only difference is that the signals in the send register 12 now include a clearance code signal inserted by the clear signal inserter 42, instead of a wanted subscriber's number.

It should be clearly understood that this embodiment has been described by way of example only, as many variations and modifications thereof will now be obvious to persons skilled in the art. The invention may be applied to telephone exchanges serving any number of subscribers and connected to any desired number of trunk channels. It is not limited to systems using time-division-multiplex trunk channels. In other embodiments, parts of the system, for instance the send register, may be duplicated or triplicated so that at least some of the operations involved in setting up two or three connections may proceed simultaneously.

I claim:

1. Telephone exchange apparatus comprising a shift register having sufficient stages for holding a subscriber's number, a trunk channel number and a herald digit, insertion means connected to the shift register for inserting a subscriber's number and a herald digit in the shift register and for shifting signals along the shift register with the herald digit leading, local number detection means connected to the shift register, control means connected to the local number detection means and to a predetermined stage of the shift register and responsive to the occurrence of the herald digit therein for rendering effective the local number detection means, and a switching crosspoint matrix connected to receive outputs from the local number detection means.

2. Telephone exchange apparatus as claimed in claim 1 wherein said control means comprises a trigger circuit connected to said predetermined stage of said shift register, a plurality of coincidence gates connected to an output of said trigger circuit and each to a separate output of the said local number detection means, said switching crosspoint matrix having a plurality of imputs which are connected to the outputs of said plurality of coincidence gates.

3. Telephone exchange apparatus as claimed in claim 2 wherein there are provided a plurality of input lines, a plurality of signal detector means connected one to each of said input lines and each arranged to provide an output signal in response to a signal on an input line, and means for connecting an output from each of said signal detector means to a separate one of said coincidence gates.

4. Telephone exchange apparatus as claimed in claims 2 wherein the said local number detection means comprises output means for carrying a trunk access enabling signal whenever the said herald digit is in said predetermined stage and said shift register contains a number of a distant subscriber, and trunk channel supervisory means connected to said output means and responsive to the said trunk access enabling signal.

5. Telephone exchange apparatus as claimed in claim 4 comprising channel number insertion means, connected to the shift register and to the trunk channel supervisory means, for inserting the number of a selected trunk channel into the shift register in response to a signal from the trunk channel supervisory means, and transmission means connected to the control means and controlled thereby for transmitting the contents of the shift register to a distant exchange following the occurrence of said herald digit in said predetermined stage of said shift register.

6. Telephone exchange apparatus as claimed in claim 5 comprising clearance signal insertion means connected to the trunk channel supervisory means and to the shift register for inserting a clearance signal and a herald digit into the shift register in response to a signal from the trunk channel supervisory means.

7. Telephone exchange apparatus as claimed in claim 1 wherein there is provided receiving apparatus comprising a further shift register, reception means, data insertion means connected to the said further shift register and to the reception means for inserting received data signals into the said further shift register, and a further local number detection means connected to the said further shift register.

8. Telephone exchange apparatus as claimed in claim 2 wherein there is provided receiving apparatus comprising a further shift register, reception means, data insertion means connected to the said further shift register and to the reception means for inserting received data signals into the said further shift register, and a further local number detection means connected to the said further shift register.

9. Telephone exchange apparatus as claimed in claim 8 comprising a set of OR-gates, each having an input connected to a separate one of the said plurality of coincidence gates, another input connected to a corresponding output of the said further local number detection means, and an output connected to a corresponding input of the said switching crosspoint matrix.

10. Telephone exchange apparatus as claimed in claim 5 wherein there is provided receiving apparatus comprising a further shift register, reception means, data insertion means connected to the said further shift register and to the reception means for inserting received data signals into the said further shift register, and a further local number detection means connected to the said further shift register.

11. Telephone exchange apparatus as claimed in claim 10 wherein outputs of the said further local number detection means are connected to the said trunk channel supervisory means.

12. Telephone exchange apparatus as claimed in claim 11 comprising channel number detection means and clearance signal detection means, both connected to the said further shift register and to the said trunk channel supervisory means.

13. Telephone exchange apparatus as claimed in claim 12 wherein outputs of the said channel number detection means are connected to separate inputs of the said switching crosspoint matrix.

14. Telephone exchange apparatus as claimed in claim 7 wherein the said data insertion means comprises a majority voting device for removing redundancy from the received data signals.

15. Telephone exchange apparatus as claimed in claim 13 wherein the said data insertion means comprises a majority voting device for removing redundancy from the received data signals.

16. Telephone exchange apparatus as claimed in claim 10 wherein the outputs of the coincidence gates are connected to the inputs of the switching crosspoint matrix through separate OR-gates, each OR-gate having one input connected to one of the coincidence gate outputs and another input connected to a corresponding output of the second local number detector.

References Cited

UNITED STATES PATENTS 3,290,446 12/1966 Ceonzo -------------- 179—18

RALPH D. BLAKESLEE, Primary Examiner